Oct. 17, 1961     F. L. ANKENEY     3,004,773
HITCHES FOR AIRCRAFT
Filed July 31, 1959     2 Sheets-Sheet 1
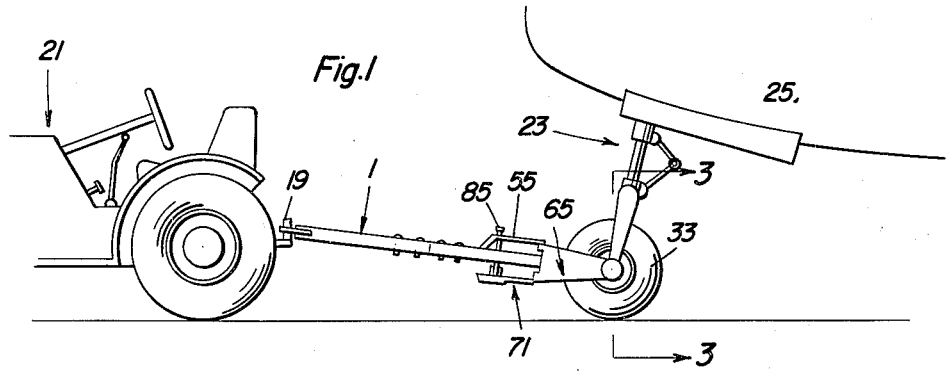
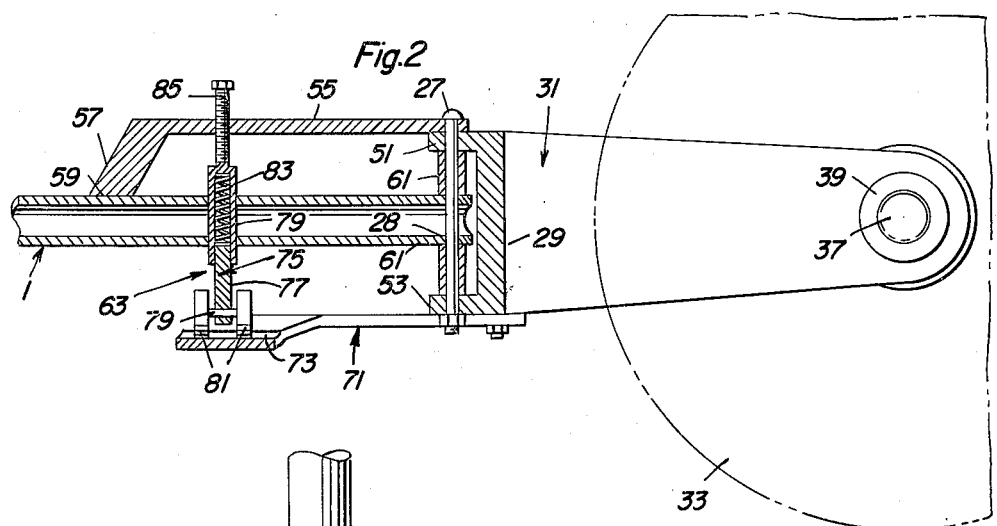
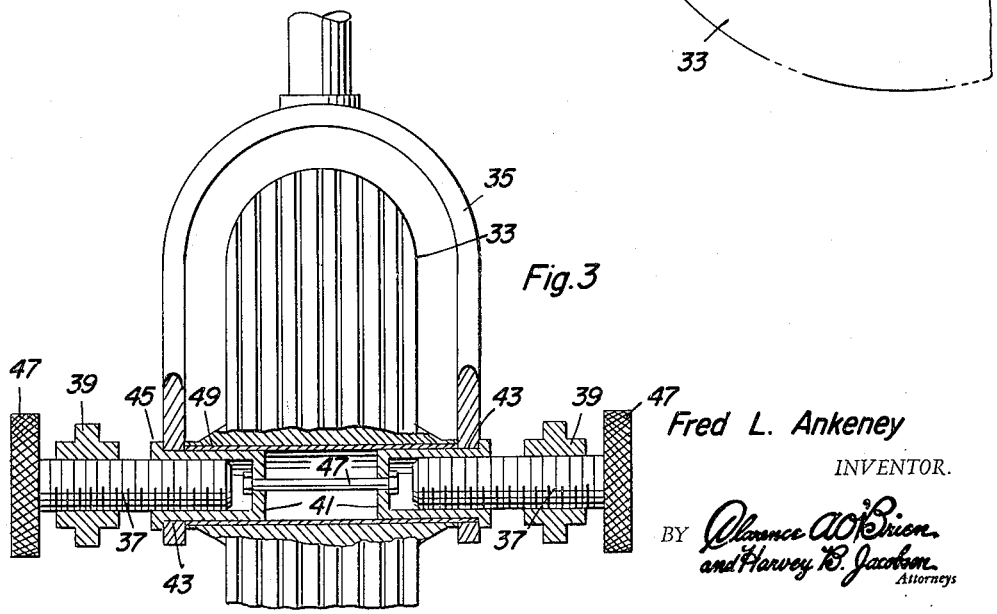
Fred L. Ankeney
INVENTOR.

Oct. 17, 1961    F. L. ANKENEY    3,004,773
HITCHES FOR AIRCRAFT
Filed July 31, 1959    2 Sheets-Sheet 2

Fred L. Ankeney
INVENTOR.

BY Clarence A. O'Brien
and Harvey B. Jacobson
Attorneys

United States Patent Office 3,004,773
Patented Oct. 17, 1961

3,004,773
HITCHES FOR AIRCRAFT
Fred L. Ankeney, Rte. 3, Xenia, Ohio
Filed July 31, 1959, Ser. No. 830,754
4 Claims. (Cl. 280—446)

This invention relates to improvements in hitches for coupling the nose landing gear of aircraft to a tractor for towing in a field, runway, or the like.

By way of premise, turning movement of the nose wheel and its fork of such landing gear in either direction for steering purposes is limited and force applied to the wheel or wheel fork tending to turn the same beyond said limits will result in damage to or breakage of the landing gear.

Having the foregoing in mind, the particular object of this invention is to provide a hitch for such landing gear for coupling to a tractor and which is adapted to swing laterally in the limits of turning movement of the nose wheel and its fork so that if the tractor makes a shorter turn than that which the nose wheel and its fork are capable of executing, the nose landing gear will not be damaged.

Another object is to provide a hitch for the above purposes which is comparatively simple in construction, safe to use, substantially foolproof, econimcal to manufacture and durable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary view in side elevation of the hitch according to this invention attached to the fork of the nose landing gear of a conventional aircraft;

FIGURE 2 is an enlarged fragmentary view partly in side elevation and partly in longitudinal section of the same;

FIGURE 3 is an enlarged fragmentary view in vertical cross-section taken on the line 3—3 of FIGURE 1;

Figure 4:
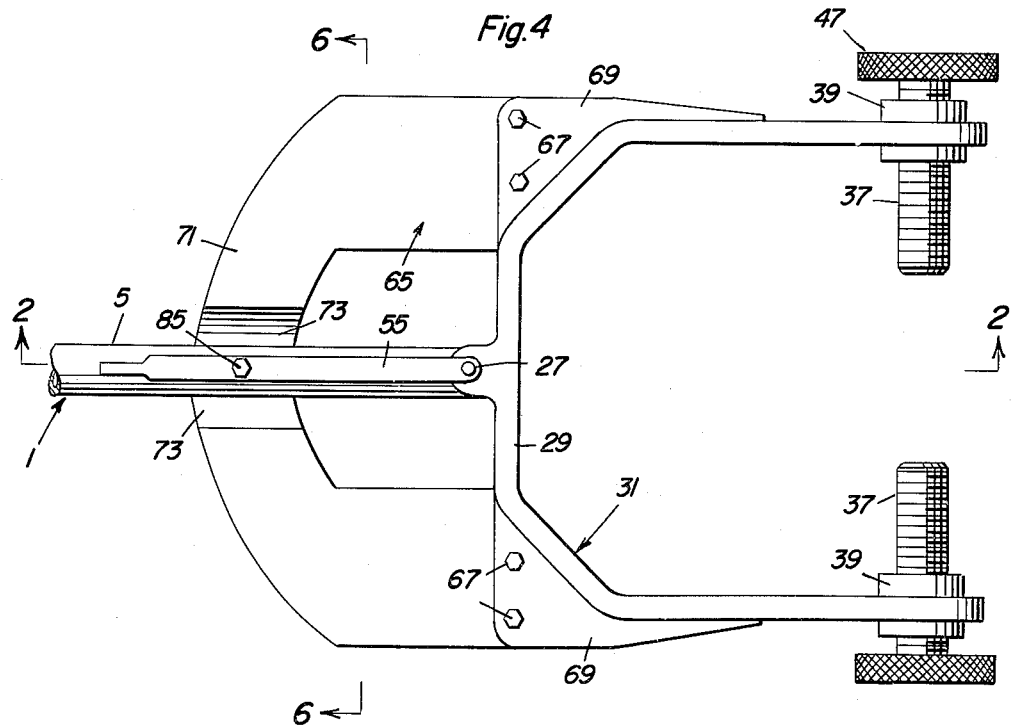
FIGURE 4 is an enlarged fragmentary view in plan of the hitch.
Figure 5:
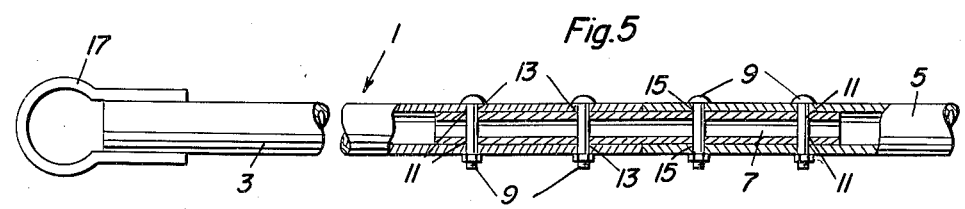
FIGURE 5 is an enlarged fragmentary view in side elevation, partly broken away and partly in longitudinal section, of a draft tongue forming part of the hitch; and, FIGURE 6 is a view in transverse section taken on the line 6—6 of FIGURE 4.
Figure 6:
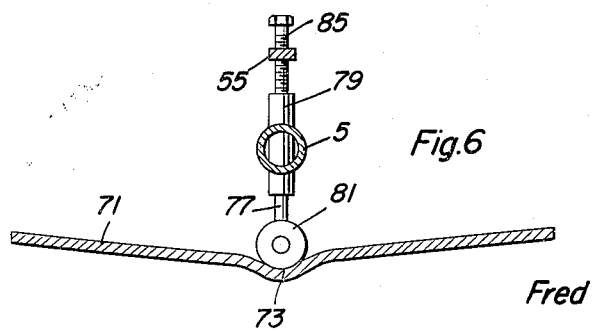

Referring to the drawings by numerals, the hitch of this invention in the illustrated preferred embodiment thereof comprises a tubular draft tongue, designated generally by the numeral 1, and comprising front and rear tubular female sections 3, 5 slidably fitted over an intermediate male section 7.

Bolts 9, preferably four in number, secure said sections 3, 5, 7 together with the female sections 3, 5 abutting, and said bolts 9 are selectively insertable through pairs of diametrically opposite bolt holes 11 in the male section 7 adapted to register with similarly arranged pairs of bolt holes 13, 15 in the female sections 3, 5, respectively, spaced longitudinally thereof so that said tongue 1 may be slidably extended and secured in extended position.

A conventional coupler member 17 on the front end of the front male section 3 provides for coupling the tongue 1 to the usual hitch member 19 on a tractor 21.

Means is provided for attaching the tongue 1 to the nose landing gear 23 of an aircraft 25 comprising the following. The tongue 1 is pivoted by an upright king bolt 27 to the front end 29 and in the longitudinal center of a rearwardly opening U-shaped attaching yoke 31 straddling the nose wheel 33 and its fork 35 of the nose landing gear 23 of the aircraft 25 and from which said tongue 1 extends forwardly.

The yoke 31 is vertically swingably attached to the fork 35 by means of a pair of transverse tap bolts 37 threaded through rear end enlargements 39 on opposite sides of the yoke 31 and into a pair of cylindrical sockets 41 journaled in the usual pair of openings 43 in the fork 35, said sockets having outer end flanges 45 engaging the sides of the yoke 35. A bolt connection 47 adjustably ties the sockets 41 together with the flanges 45 clamped against opposite sides of the fork 35 to prevent said fork from spreading and provides also for relative axial adjustment of the yoke 31 and the fork 35 for centering said yoke relative to forks 35 of different widths. By turning the tap bolts 37, by means of knurled heads 47 thereon, the yoke 31 may be exactly centered relative to the fork 35.

The sockets 41 are rotatably fitted in a transverse tubular bushing 49 in the fork 35 clamped between the sides of the fork and on which the nose wheel 33 is rotatably mounted by means forming, per se, no part of this invention and therefore merely indicated conventionally.

The king bolt 27 extends through a pair of upper and lower forwardly extending lugs 51, 53 on the front end 29 of the yoke 31 and through the rear end of a forwardly extending tongue bracing bar 55 which overlies the upper lug 51 and the tongue 1 parallel with the latter and is provided with a downturned front end 57 welded, as at 59, to the rear section 5 of the tongue 1. Spacing sleeves 61 on the king bolt 27 above and below the tongue 1 prevent up and down play of the tongue 1 on the king bolt 27. As will be understood, the king bolt 27 pivotally extends through suitable openings 28 in the rear section 5 of the tongue 1 at the rear end of said section 5.

As will now be seen, the tongue 1 is mounted on the yoke 31 for lateral swinging relative to the yoke 31, nose wheel 33 and its fork 35, which is to say independently of the nose landing gear 23, in the limits of turning movement of said nose wheel 33 and fork 35 for steering purposes. This is for the purpose of compensating for the tractor 21 making shorter turns than the nose wheel 33 and its fork 35 are capable of performing. However, detent means is provided for normally yieldingly retaining the tongue 1 coplanar with the nose wheel 33 until the tractor 21 makes such shorter turns in the limits of turning movement of the nose wheel 33 and its yoke 35 and thereby tends to turn said wheel 33, and yoke 35 beyond its limits of turning movement and subject the landing gear to damaging stresses or strains.

The detent means is designated generally by the numeral 63 and comprises a U-shaped detent plate 65 extending forwardly from the bottom of the attaching yoke 31 beneath the tongue 1 and which is terminally bolted, as at 67, to side lugs 69 on said yoke 31 and embodies a front arcuate track portion 71 in front of the king bolt 27 transverse to the tongue 1 and concentric to the king bolt 27, which is to say, concentric to the axis of lateral swinging movement of the tongue 1. The track portion 71 is provided with a central, transverse deep, round bottom notch 73 transverse to the track portion 71 but extending longitudinally in the plane of the nose wheel 33. A detent device 75 is carried by the tongue 1 for coaction with the notch 73 to yieldingly retain the tongue 1 coplanar with the nose wheel 33 and its yoke 35 until the tractor 1 turns so short that the tongue 1 is urged laterally on the king pin 27 in a manner to urge the nose wheel 33 and its fork 35 beyond either limit of turning or steering movement of said wheel and fork.

The detent device 75 comprises an upright cylindrical plunger 77 intermediate the tongue 1 and the detent plate 71 vertically slidably depending out of an upright cylinder 79 slidably adjustably extended upwardly through the tongue 1. The plunger 77 is provided on its lower end with a transverse axle rod 79 having a pair or rollers 81 thereon at opposite sides of the plunger 77 adapted, when the tongue 1 is coplanar with the nose wheel 33 and the fork 35, that is to say, in normal position, to seat in the notch 73. A helical tension spring 83 in the cylinder 79 above the plunger 77 loads and tensions the plunger 77 and rollers 81 against upward movement out of the notch 73. A helical screw shaft 85 on the upper end of the cylinder 79 extends upwardly through and is threaded into the brace bar 55 for screw feed downwardly and upwardly to correspondingly adjust the cylinder 79 to variably compress the spring 83 and correspondingly tension the plunger 77 and wheels 81 against upward movement and displacement of said wheels 81 out of the notch 73.

The operation of the invention will be readily understood from the foregoing. Suffice it to further explain that if the nose wheel 33 and its fork 35 are turned by the tongue 1 into either limit of turning movement, and the tractor 21 then exerts side pressure forces on the tongue 1 tending to turn said wheel 33 and fork 35 beyond such limits of turning movement thereof, then the rollers 81 will ride upwardly out of the notch 73 and ride along the track portion 71 of the detent plate 65. Thus the tongue 1 will be swung independently of the nose landing gear 23 on the king bolt 27 and be supported by the rollers 81 in addition to the support afforded by the bar 55 and the other described means for pivotally mounting the tongue. When the tractor 21 is straightened out, the tongue 1 is straightened out into normal position in which it is coplanar with the nose wheel 33 and the fork 35 and the roller 81 will snap into the notch 73 to releaseably retain the tongue 1 in normal position in which it may be operated to turn the nose wheel 33 between its limits of movement for steering purposes. Obviously, by varying the tension or load exerted by the spring 83 the described detent can be adjusted to retain the tongue in normal position under pull exerted laterally against said tongue in different degree by the tractor.

By unscrewing the tap bolts 37 from the sockets 41, the remaining parts of the hitch may be quickly detached when use of the hitch is not required.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hitch for an aircraft nose wheel assembly having a limited steering movement, said hitch comprising in combination a U-shaped yoke adapted to straddle a nose wheel assembly and be removably attached thereto, a vertical pivot element provided centrally on the bight portion of said yoke, a draft tongue having its rear end mounted on said pivot element and extending forwardly therefrom for lateral swinging movement relative to said yoke, and means for releasably retaining said tongue against swinging from a centralized position relative to the yoke, said means comprising a curved plate secured to the bight portion of the yoke and disposed horizontally below an intermediate portion of said draft tongue, said plate being formed with a central depression and portions of the plate on opposite sides of said depression constituting a track, a vertically slidable plunger carried by said intermediate portion of said tongue, roller means provided at the lower end of said plunger and rotatable about an axis parallel to the tongue, and resilient means biasing said plunger downwardly and urging said roller means to seat in said depression of said plate, said roller means being movable along said track upon upward sliding of the plunger against the bias of said resilient means during swinging of said tongue from its centralized position.

2. The device as defined in claim 1 together with means for adjusting the resiliency of said resilient means.

3. The device as defined in claim 1 together with a vertical tubular guide carried by said tongue and having said plunger slidable therein, said guide having a closed upper end and said plunger projecting downwardly from its lower end, said resilient means comprising a compression spring positioned in said guide between the upper end of the latter and said plunger.

4. The device as defined in claim 3 wherein said guide is slidably and rotatably mounted in said tongue, an upwardly projecting screw-threaded stud rigid with the upper end of said guide, and a bracket secured to said tongue and having a portion thereof spaced above the tongue and provided with a screw-threaded aperture, said stud threadedly engaging said aperture, whereby upon rotation of the stud said guide may be raised and lowered relative to said tongue to adjust the resiliency of said spring.

References Cited in the file of this patent
UNITED STATES PATENTS

| | | |
|---|---|---|
| 1,460,839 | Biggam | July 3, 1923 |
| 2,124,043 | Smith | July 19, 1938 |
| 2,131,068 | Payne | Sept. 27, 1938 |
| 2,654,613 | Blair et al. | Oct. 6, 1953 |
| 2,773,703 | Ferguson et al. | Dec. 11, 1956 |